United States Patent
Zetek et al.

(10) Patent No.: US 11,219,955 B2
(45) Date of Patent: *Jan. 11, 2022

(54) MILLING CUTTER WITH BRACES

(71) Applicant: Západočeská univerzita v Plzni, Plzen (CZ)

(72) Inventors: Miroslav Zetek, Plzen (CZ); Vaclav Schornik, Milevsko (CZ)

(73) Assignee: Zapadoceska Univerzita V Plizni, Plzen (CZ)

( * ) Notice: Subject to any disclaimer, the term of this patent is extended or adjusted under 35 U.S.C. 154(b) by 0 days.

This patent is subject to a terminal disclaimer.

(21) Appl. No.: 17/027,314

(22) Filed: Sep. 21, 2020

(65) Prior Publication Data

US 2021/0001414 A1    Jan. 7, 2021

Related U.S. Application Data

(63) Continuation of application No. 16/087,007, filed as application No. PCT/CZ2017/000026 on Apr. 13, 2017, now Pat. No. 10,799,960.

(30) Foreign Application Priority Data

Apr. 14, 2016   (CZ) .............................. CZ 2016-215

(51) Int. Cl.
| | |
|---|---|
| *B23C 5/00* | (2006.01) |
| *B23C 5/06* | (2006.01) |
| *B23C 5/20* | (2006.01) |
| *B23C 5/22* | (2006.01) |

(52) U.S. Cl.
CPC ............... *B23C 5/006* (2013.01); *B23C 5/06* (2013.01); *B23C 5/20* (2013.01); *B23C 5/22* (2013.01)

(58) Field of Classification Search
CPC .. B23C 5/006; B23C 5/06; B23C 5/20; B23C 5/22
See application file for complete search history.

(56) References Cited

U.S. PATENT DOCUMENTS

| | | | | |
|---|---|---|---|---|
| 2,600,280 | A * | 6/1952 | Staples | B23C 5/02 408/156 |
| 5,567,092 | A * | 10/1996 | Post | B23C 5/006 407/36 |
| 5,605,420 | A * | 2/1997 | Feldsine | B23C 5/006 407/32 |
| 6,120,218 | A * | 9/2000 | Bishop | B23C 5/006 407/34 |
| 6,595,727 | B2 * | 7/2003 | Arvidsson | B23C 5/006 407/35 |
| 2002/0168235 | A1 * | 11/2002 | Johnson | B23C 5/2221 407/35 |
| 2005/0019110 | A1 * | 1/2005 | Astrakhan | B23C 5/2221 407/48 |
| 2005/0164620 | A1 * | 7/2005 | Amamoto | B23C 5/006 451/548 |

(Continued)

*Primary Examiner* — Nicole N Ramos
(74) *Attorney, Agent, or Firm* — Hovey Williams LLP

(57) ABSTRACT

The milling cutter according to the present invention consists of insert holders where these insert holders project from a carrier disc which is adapted for clamping onto the spindle of a machine tool, and the individual holders are connected with one another by braces. Arms are provided between the holders and the carrier disc.

7 Claims, 1 Drawing Sheet

(56) References Cited

U.S. PATENT DOCUMENTS

| | | | |
|---|---|---|---|
| 2005/0166727 A1* | 8/2005 | Peltonen | B23Q 11/10 82/1.11 |
| 2011/0182677 A1* | 7/2011 | Frank | B23C 5/006 407/46 |
| 2014/0161543 A1* | 6/2014 | Francis | B23C 5/06 407/11 |

* cited by examiner

MILLING CUTTER WITH BRACES

CROSS-REFERENCE TO RELATED APPLICATIONS

This is a continuation of prior application Ser. No. 16/087,007, filed Sep. 20, 2018, entitled MILLING CUTTER WITH BRACES, which is the National Stage of International Patent Application No. PCT/CZ2017/000026, filed Apr. 13, 2017, and which claims priority to Czech Patent Application Na PV 2016-215, filed Apr. 14, 2016, each of which is incorporated herein by reference in its entirety.

TECHNICAL FIELD

The present invention concerns a milling cutter which consists of insert holders that project from a carrier disc which is adapted for clamping onto the spindle of a machine tool.

BACKGROUND ART

Milling cutters known to this date comprise insert holders arranged along the circumference of the tool body. These insert holders are separated by flutes whose primary role is to facilitate chip removal and their secondary role is to supply cutting fluid to the face of the insert. This design can be seen, for instance, in the milling cutter described in document no. CZ 278929. Milling cutters of such design are usually made of steel. Their weight tends to be substantial, which helps stabilize their rotation speed during operation by damping the shocks from inserts' engagement, but also extends the time needed to bring the spindle to its operating speed and to a halt. In addition, this design frequently causes tool imbalance, and therefore constrains the maximum number of revolutions per minute which can be achieved without the risk of damage to the spindle. Machine-tools that use these tools must be sufficiently robust, particularly for roughing operations where greater cutting forces can be expected. Where the weight of the milling cutter body needs to be reduced, the usual solution is to remove excess material based on identified actual stress distribution. Such a procedure may also compromise the accuracy of the weight distribution within the tool, resulting in balance problems at higher speeds. In order to reduce the weight of milling cutters, their bodies are sometimes made of light alloys and fitted with exchangeable inserts installed in steel pockets which are firmly attached to the body. Milling cutters of light alloys intended for cutting higher-strength materials are not suitable for roughing operations. Titanium is sometimes employed in milling cutter construction. However, as this metal s difficult to machine, tools with titanium bodies are costly.

DISCLOSURE OF INVENTION

These drawbacks are eliminated by a milling cutter which comprises insert holders that project from a carrier disc which is adapted for clamping onto the spindle of a machine tool. The insert holders are connected with one another by braces. Such a design of the carrier disc delivers maximum reduction in its weight while maintaining sufficient stiffness thanks to an appropriate configuration of the braces.

The circumference determined by the inserts can be increased by providing arms between the holders and the carrier disc.

The stiffness of the entire structure can be improved by providing struts between individual arms and braces.

The stiffness can be improved further by providing struts between the arms and the holders.

An additional increase in stiffness is achieved when the holders are arranged around a collar which does not project beyond the envelope of the inserts in either radial or face direction, and the holders are attached to the collar with stiffeners. A spatial lattice of bars constructed in this manner delivers maximum stiffness at minimum weight.

DESCRIPTION OF DRAWINGS

A general view of the milling cutter from the carrier disc side using axonometric projection is shown in FIG. 1, with the inserts omitted; a front view from the side of the holders of exchangeable inserts is in FIG. 2; another view from the side of the carrier disc is shown in FIG. 3 and a view from the side of the holders of inserts using axonometric projection is in FIG. 4.

DESCRIPTION OF EXAMPLE EMBODIMENT

Figure 2:
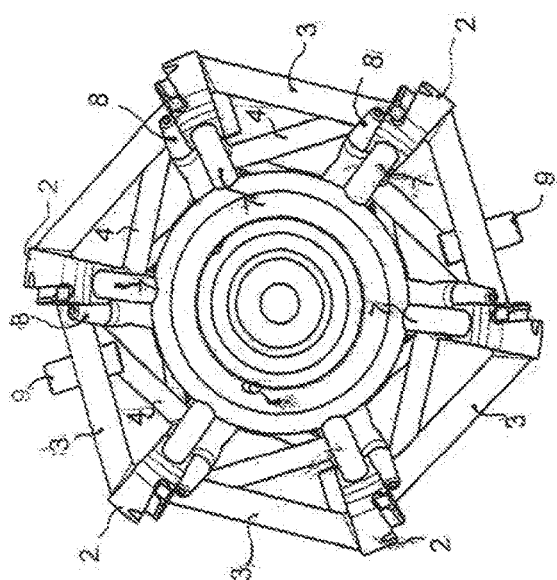
Figure 4:
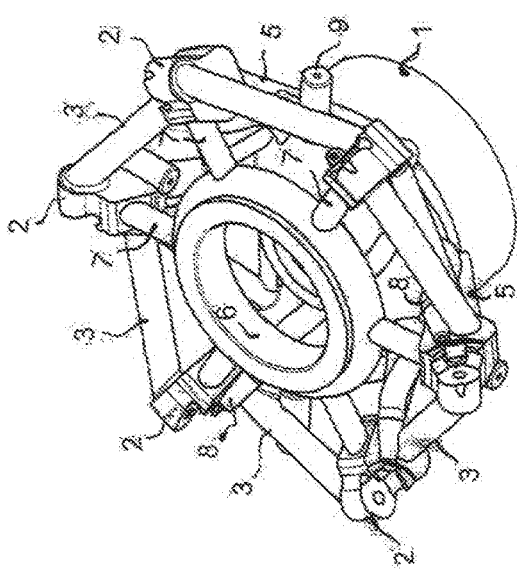
Figure 1:
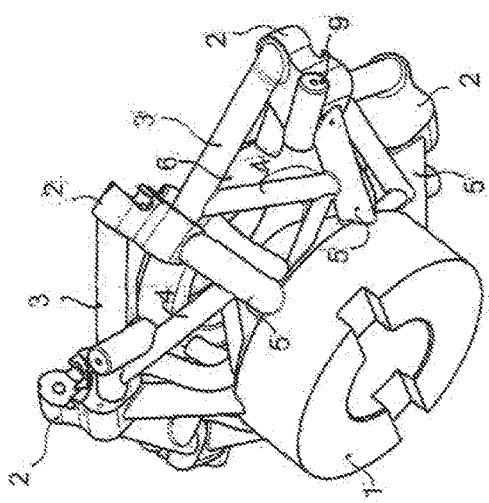
Figure 3:
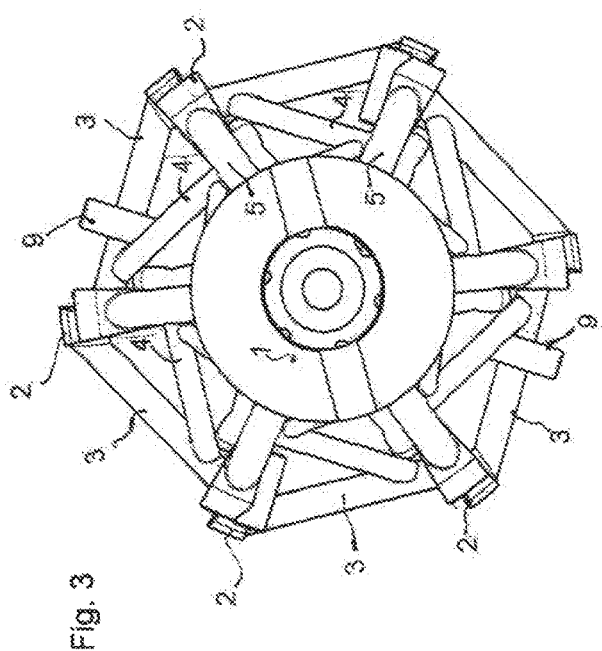

The milling cutter consists of insert holders 2 where the holders 2 project from carrier disc 1 which is adapted for clamping onto the spindle of a machine tool. The holders 2 are connected with one another by braces 3. Arms 5 are provided between the holders 2 and carrier disc 1, struts 4 are provided between the arms 5 and braces 3. Holders 2 are arranged around and connected by stiffeners 7 to the collar 6, which does not project beyond the envelope of the inserts. The inserts are not shown on the drawing; their attachment to the holders 2 is outside the scope of this invention. Leading from the carrier disc 1, which is provided with a process fluid inlet, are tubes with nozzles 8 which are aimed at faces of the inserts. The milling cutter is also provided with balancing attachments 9 which comprise bushings with adjustable weights. The balancing attachments 9 compensate for the non-uniform distribution of the tool weight and their design is outside the scope of this invention.

The invention claimed is:
1. A milling cutter comprising:
 (a) a carrier disc adapted for clamping onto a spindle of a machine tool;
 (b) a plurality of insert holders;
 (c) a plurality of braces that connect the insert holders;
 (d) a plurality of arms disposed between the insert holders and the carrier disc;
 (e) a collar that does not project beyond an envelope of inserts, wherein the insert holders are arranged around the collar; and
 (f) a plurality of stiffeners disposed between the insert holders and the collar,
 further comprising struts disposed between the arms and the braces, with each strut connecting a respective one of the arms to a respective one of the braces.
2. The milling cutter according to claim 1, said struts being disposed between the arms and the insert holders.
3. The milling cutter according to claim 1, further comprising nozzles protruding from the carrier disc.
4. A milling cutter comprising:
 (a) a carrier disc adapted for clamping onto a spindle of a machine tool;
 (b) a plurality of insert holders spaced circumferentially relative to one another;
 (c) a plurality of braces that connect the insert holders;

(d) a plurality of arms, with each arm connecting the carrier disc and a respective insert holder;
(e) a collar that does not project beyond an envelope of inserts, wherein the insert holders are arranged around the collar; and
(f) a plurality of radially-extending stiffeners connected to the collar and to respective insert holders, further comprising struts disposed between the arms and the braces.

5. The milling cutter according to claim 4, each of said struts connecting a respective one of the arms to a respective one of the braces.

6. The milling cutter according to claim 4, further comprising struts disposed between the arms and the insert holders.

7. A milling cutter comprising:
(a) a carrier disc adapted for clamping onto a spindle of a machine tool;
(b) a plurality of insert holders spaced circumferentially relative to one another;
(c) a plurality of braces that connect the insert holders;
(d) a plurality of arms, with each arm connecting the carrier disc and a respective insert holder;
(e) a collar that does not project beyond an envelope of inserts, wherein the insert holders are arranged around the collar; and
(f) a plurality of radially-extending stiffeners connected to the collar and to respective insert holders, further comprising nozzles protruding from the carrier disc.

\* \* \* \* \*